United States Patent
Lin et al.

(10) Patent No.: US 8,504,826 B2
(45) Date of Patent: Aug. 6, 2013

(54) CLIENT AND HOST VALIDATION BASED ON HASH OF KEY AND VALIDATION OF ENCRYPTED DATA

(75) Inventors: Chun-Hsu Lin, New Taipei (TW); Ching-Wei Ho, New Taipei (TW); Che-Yi Chu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 104 days.

(21) Appl. No.: 13/187,528

(22) Filed: Jul. 21, 2011

(65) Prior Publication Data

US 2012/0102323 A1   Apr. 26, 2012

(30) Foreign Application Priority Data

Oct. 25, 2010   (TW) .............................. 99136385 A

(51) Int. Cl.
G06F 7/76 (2006.01)
H04L 9/08 (2006.01)
G06F 7/06 (2006.01)

(52) U.S. Cl.
CPC ..................................... *H04L 9/0844* (2013.01)
USPC ............................................ 713/161; 726/29

(58) Field of Classification Search
None
See application file for complete search history.

(56) References Cited

U.S. PATENT DOCUMENTS

2010/0217987 A1 *   8/2010   Shevade ........................ 713/175

* cited by examiner

*Primary Examiner* — Venkat Perungavoor
(74) *Attorney, Agent, or Firm* — Altis Law Group, Inc.

(57) ABSTRACT

A data security protection method generates dynamic encryption keys and dynamic decryption keys for a host and a client during data transmission between the host and the client. The host stores a host initial key $K_0$, and determines a host key $K_n$ using a one-way hash function based on the host initial key $K_0$. The client stores a client initial key $K'_0$, and determines a client key $K'_n$ using the one-way hash function based on the client initial key $K'_0$. Original data $R_n$ is encrypted as encrypted data $X_n$ using the host key $K_n$ before being sent to the client. The client decrypts the encrypted data $X_n$ using the client key $K'_n$, to obtain the original data $R_n$.

12 Claims, 5 Drawing Sheets

CLIENT AND HOST VALIDATION BASED ON HASH OF KEY AND VALIDATION OF ENCRYPTED DATA

BACKGROUND

1. Technical Field

Embodiments of the present disclosure relate to security mechanisms, and more particularly, to a data security protection method.

2. Description of Related Art

How to protect legitimate rights and interests of digital content owners is a problem. Often, two ways are commonly used, one, a provider of digital content may provide a registration code to valid users of the digital content, the other is that the provider may encrypt the digital content using an encryption mechanism, and provide a decryption key to valid users. However, static registration code and decryption keys are too easily hacked.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
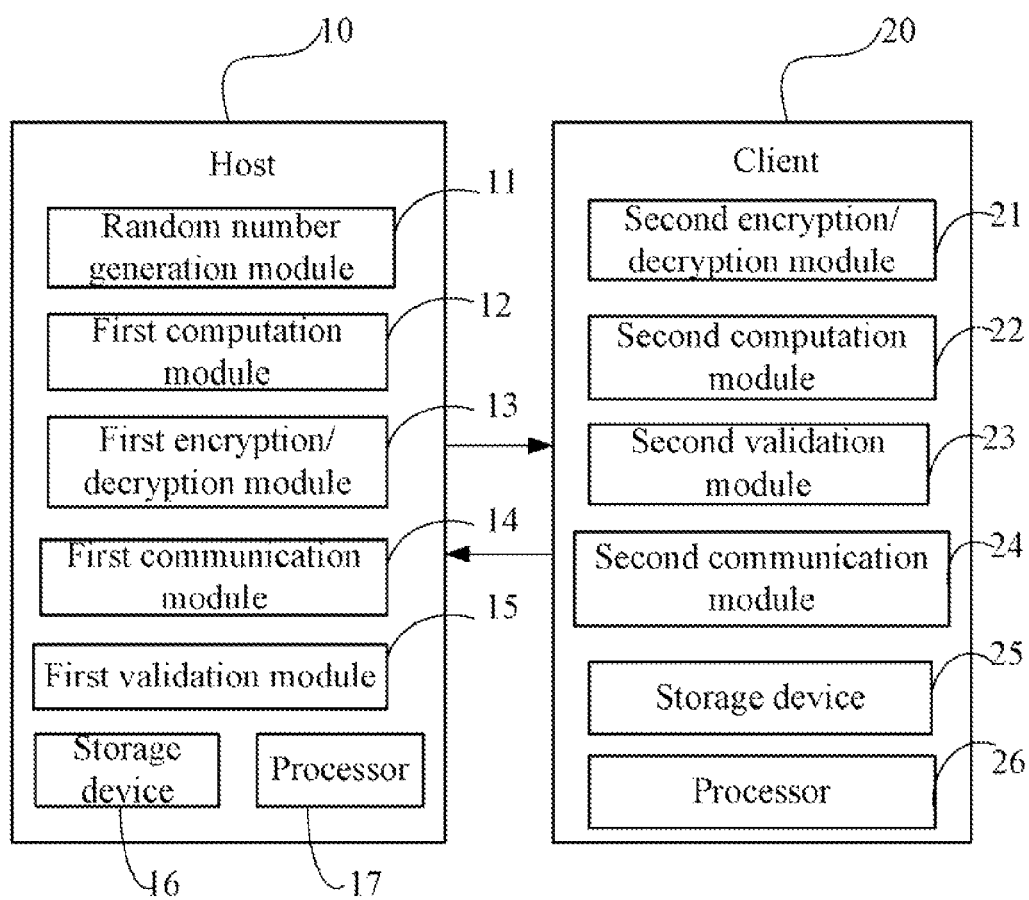
FIG. 1 is a block diagram of one embodiment of an application environment of a data security protection method.

FIG. 1 is a block diagram of one embodiment of an application environment of a data security protection method. In one embodiment, the data security protection method may be executed by a host 10 and a client 20. The host 10 may be a computer or a server. The client 20 may be a computer, an MP4 player, or other electronic device. The data security protection method generates dynamic encryption keys and dynamic decryption keys for the host 10 and the client 20 during data transmission between the host 10 and the client 20.

In one embodiment, the host 10 includes a plurality of function modules, such as a random number generation module 11, a first computation module 12, a first encryption/decryption module 13, a first communication module 14, and a first validation module 15. The modules 11-15 may comprise computerized code in the form of one or more programs (computer readable program code) that are stored in a storage device 16 of the host 10. The computerized code includes instructions that are executed by a processor 17 of the host 10 to provide the below described functions of the modules 11-15 illustrated in FIG. 2A and FIG. 2B.

The client 20 also includes a plurality of function modules, such as a second encryption/decryption module 21, a second computation module 22, a second validation module 23, and a second communication module 24. The modules 21-24 may comprise computerized code in the form of one or more programs (computer readable program code) that are stored in a storage device 25 of the client 20. The computerized code includes instructions that are executed by a processor 26 of the client 20 to provide the below described functions of the modules 21-24 illustrated in FIG. 2A and FIG. 2B.

Figure 2A:
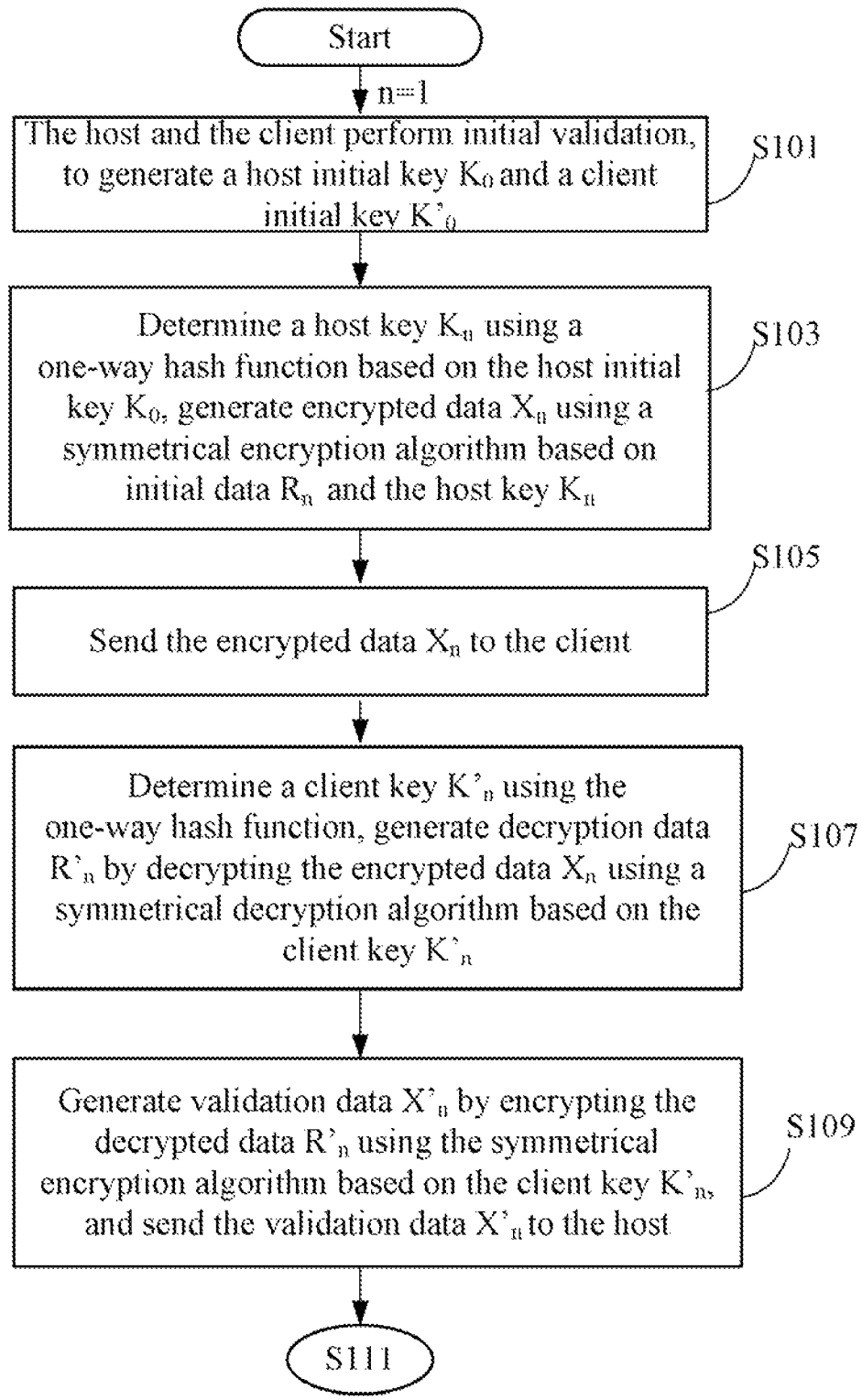
FIG. 2A and FIG. 2B are a block diagram of one embodiment of a data security protection method.
Figure 2B:
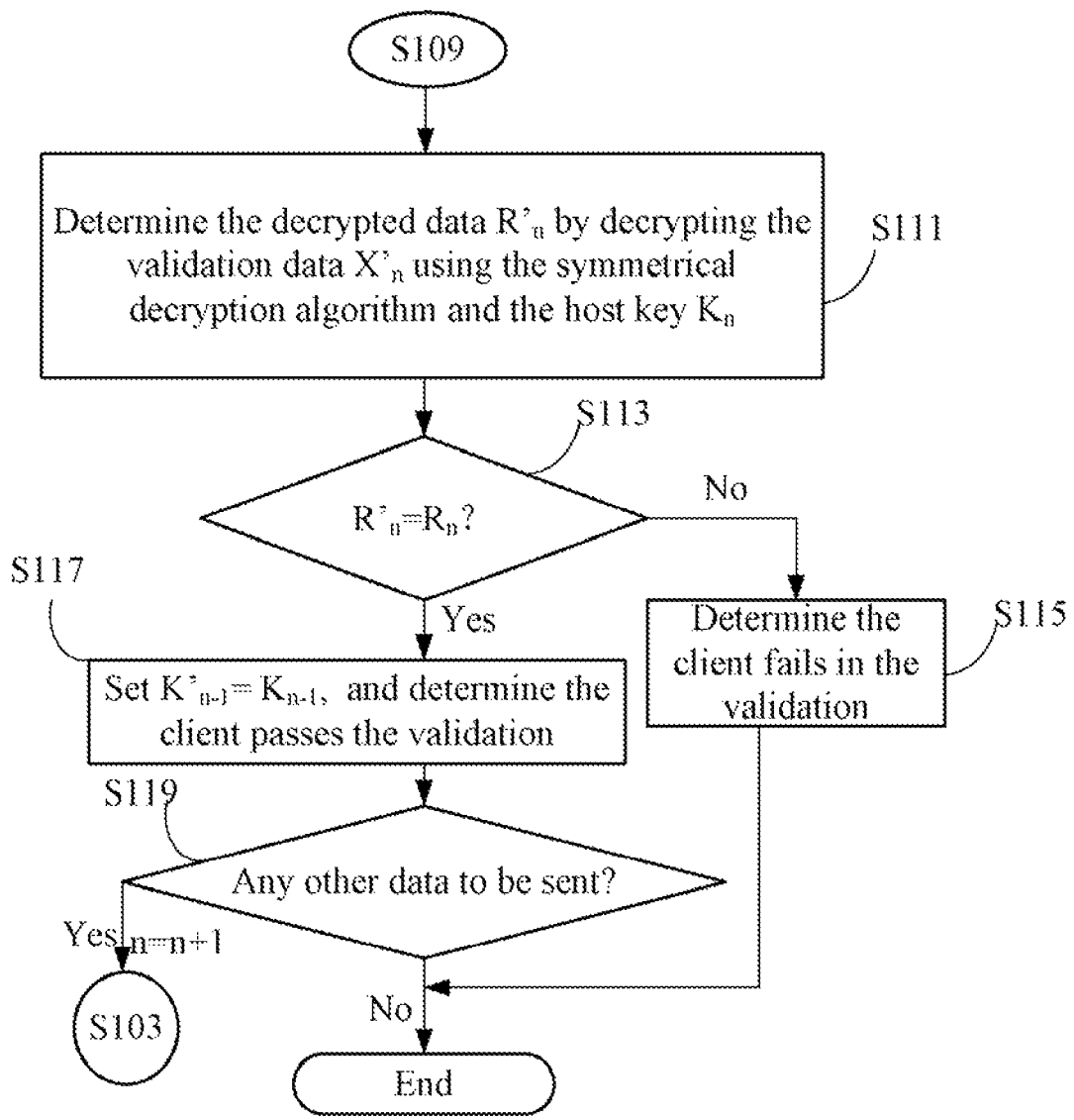

FIG. 2A and FIG. 2B are a flowchart of one embodiment of the data security protection method. Depending on the embodiment, additional blocks may be added, others removed, and the ordering of the blocks may be changed.

In block S101, the host 10 and the client 20 perform an initial validation process that generates a host initial key $K_0$ for the host 10 and a client initial key $K'_0$ for the client 20. The below detailed description of block S101 refers to FIG. 3A and FIG. 3B.

In block S103, the first computation module 12 determines a host key $K_n$ using a one-way hash function based on the host initial key $K_0$, where $K_n = H(K_{n-1})$, H represents the one-way hash function, n is an integer having an initial value 1 (when block S103 is implemented the first time). In one embodiment, the one-way hash function may be a message digest algorithm (MD5), a secure hash algorithm (SHA), a message authentication code (MAC), or a cyclic redundancy check (CRC), for example. The first encryption/decryption module 13 generates encrypted data $X_n$ using a symmetrical encryption algorithm based on original data $R_n$ and the host key $K_n$, where $X_n = E_{Kn}(R_n)$, E represents the symmetrical encryption algorithm. The symmetrical encryption algorithm may be advanced encryption standard (AES), data encryption standard (DES), for example. All host keys $K_n$, original data $R_n$, and encrypted data $X_n$ are stored in the storage device 16.

In block S105, the first communication module 14 sends the encrypted data $X_n$ to the client 20.

In block S107, the second computation module 22 determines a client key $K'_n$ using the one-way hash function based on the client initial key $K'_0$, where $K'_n = H(K'_{n-1})$. The second encryption/decryption module 21 determines decrypted data $R'_n$ by decrypting the encrypted data $X_n$ using a symmetrical decryption algorithm based on the client key $K'_n$. The symmetrical decryption algorithm matches the symmetrical encryption algorithm, for example, if the symmetrical encryption algorithm is AES, then the symmetrical decryption algorithm is also AES.

In block S109, the second encryption/decryption module 21 generates validation data $X'_n$ using the symmetrical encryption algorithm based on the decrypted data $R'_n$ and the client key $K'_n$, $X'_n = E_{K'n}(R'_n)$. The second communication module 24 sends the validation data $X'_n$ to the host 10, to request the host 10 to validate the client 20 for transmission of original data $R_{n+1}$.

In block S111, the first encryption/decryption module 13 determines the decrypted data R'n by decrypting the validation data $X'_n$ using the symmetrical decryption algorithm and the host key $K_n$.

In block S113, the first validation module 15 checks if the decrypted data $R'_n$ is the same as the original data $R_n$. If the decrypted data $R'_n$ is different from the original data $R_n$, block S115 is implemented, the first validation module 15 determines that the client 20 fails in the validation, and the host 10 refuses to transmit any more data, and the procedure ends.

Otherwise, if the decrypted data $R'_n$ is the same as the original data $R_n$, block S117 is implemented.

In block S117, the first validation module 15 sets the −1 client key $K'_{n-1}$ equals the −1 host key $K_{n-1}$, and determines the client 20 passes the validation. Then in block S119, the first communication module 14 checks if there is original data $R_{n+1}$ to be transmitted. If there is original data $R_{n+1}$ to be transmitted, the procedure returns to block S103. Otherwise, if there is no more original data to be transmitted, the procedure ends.

It should be understood that, the host 10 and the client 20 can pre-store the host initial key $K_0$ and the client initial key $K'_0$. In this situation, block S101 can be omitted.

Figure 3A:
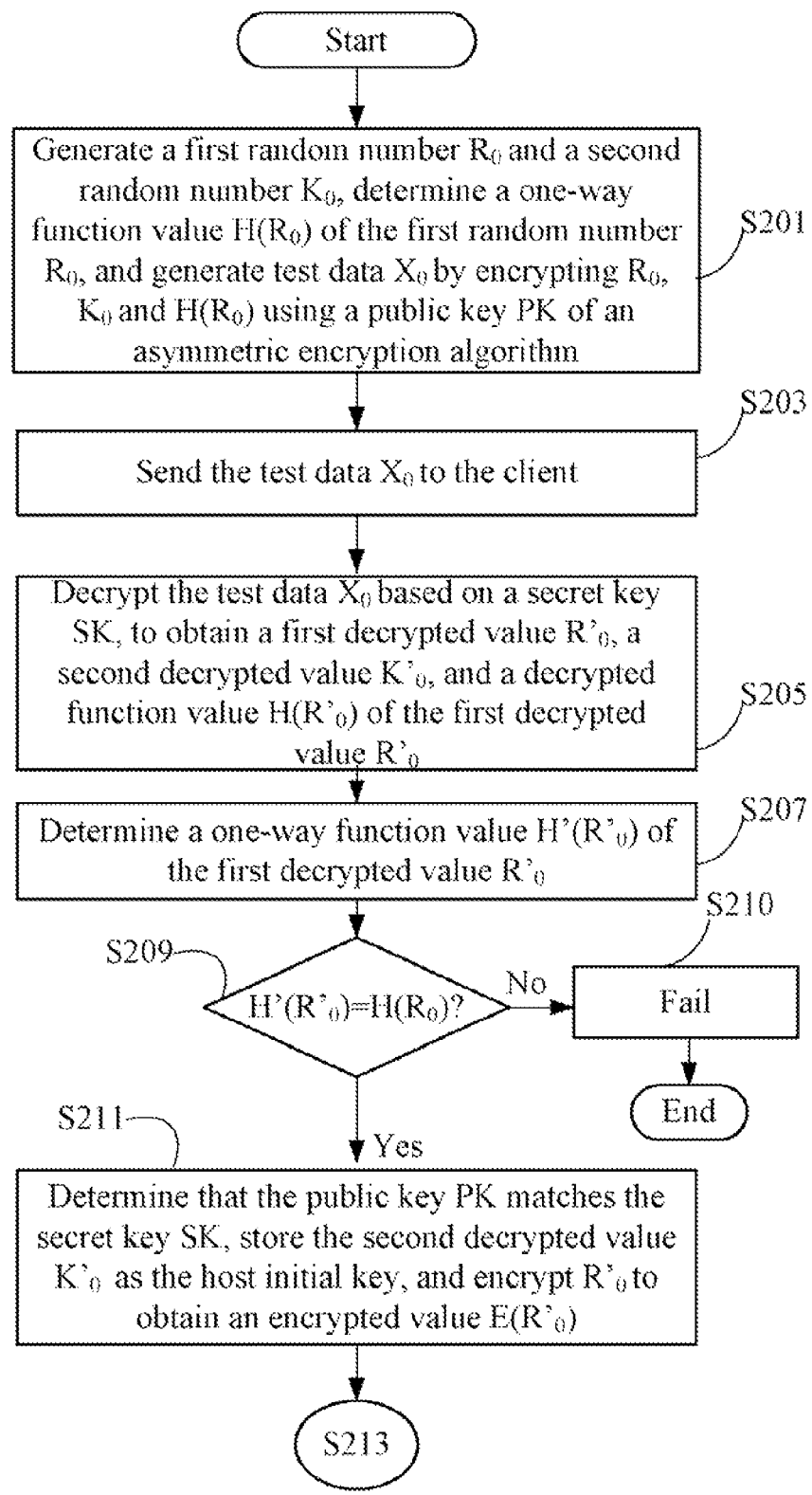
FIG. 3A and FIG. 3B are a block diagram of one embodiment detailing an initial validation block in FIG. 2A.
Figure 3B:
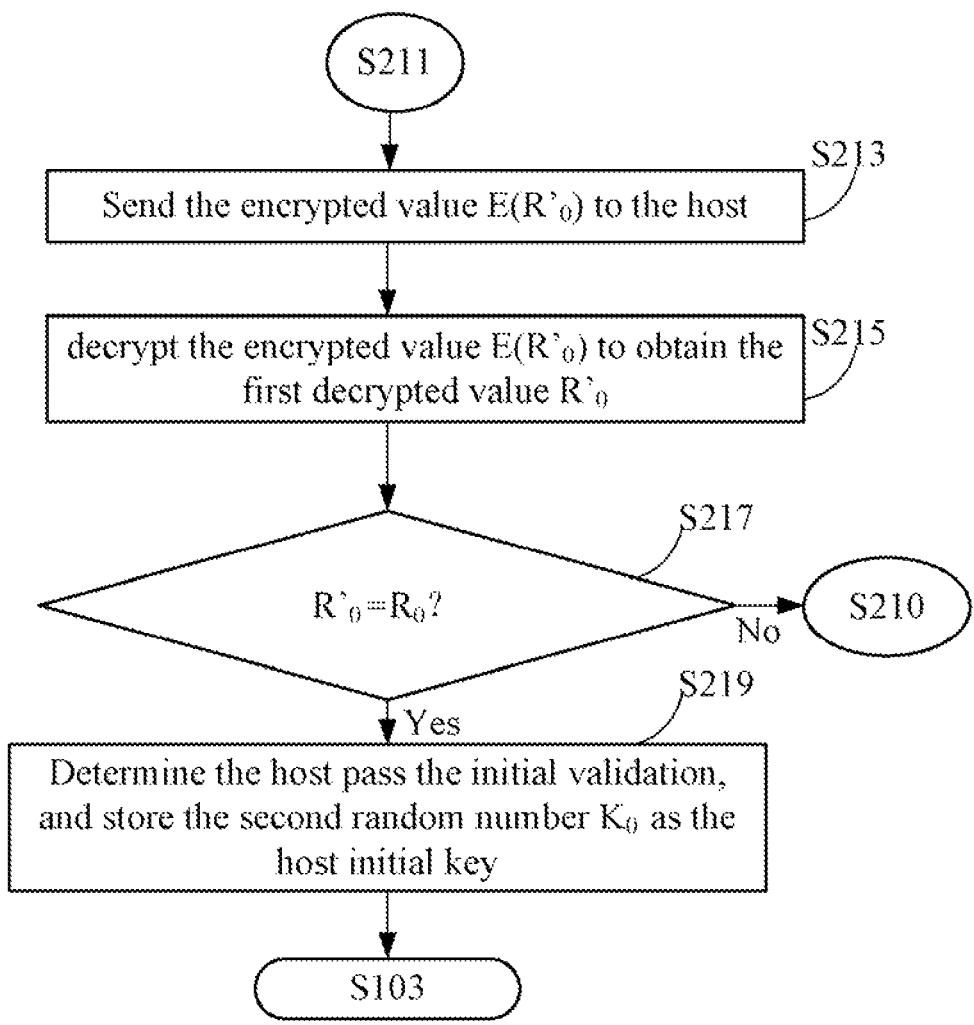

Referring to FIG. 3A and FIG. 3B, a detailed description of block S101 follows. Depending on the embodiment, additional blocks may be added, others removed, and the ordering of the blocks may be changed.

In block S201, the random number generation module 11 generates a first random number $R_0$ and a second random number $K_0$, determines a one-way function value $H(R_0)$ of the first random number $R_0$, generates test data $X_0$ by encrypting $R_0$, $K_0$ and $H(R_0)$ using a public key PK of an asymmetric encryption algorithm, where $X_0=E_{PK}(R\|H(R)\|K)$, $E_{PK}$ represents the asymmetric encryption algorithm. In one embodiment, the asymmetric encryption algorithm may be RSA or DSA. The public key PK, the first random number $R_0$, the second random number $K_0$, the one-way function value $H(R_0)$, and the test data $X_0$ are stored in the storage device 16 of the host 10.

In block S203, the first communication module 14 sends the text data $X_0$ to the client 20.

In block S205, the second encryption/decryption module 21 decrypts the test data $X_0$ using a secret key SK of the asymmetric encryption algorithm, to obtain a first decrypted value $R'_0$, a second decrypted value $K'_0$, and a decrypted function value $H(R'_0)$ of the first decrypted value $R'_0$. The secret key SK, the first decrypted value $R'_0$, the second decrypted value $K'_0$, and the decrypted function value $H(R'_0)$ are stored in the storage device 25 of the client 20.

In block S207, the second computation module 22 determines a one-way function value $H'(R'_0)$ of the first decryption value $R'_0$ using the one-way hash function.

In block S209, the second validation module 23 determines if the one-way hash function value $H'(R'_0)$ is the same as the decrypted function value $H(R'_0)$, to determine if the public key PK of the host 10 matches the private key SK of the client 20. If the one-way function value $H'(R'_0)$ is different from the decrypted function value $H(R'_0)$, block S210 is implemented, the second validation module 23 determines that the host 10 fails the initial validation. Otherwise, if the one-way function value $H'(R'_0)$ is the same as the decrypted function value $H(R'_0)$, block S211 is implemented.

In block S211, the second validation module 23 determines that the public key PK of the host 10 matches the private key SK of the client 20, and stores the second decrypted value $K'_0$ as the client initial key. The second encryption/decryption module 21 encrypts the first decrypted value $R'_0$ using the symmetric encryption algorithm and the client initial key $K'_0$, to obtain an encrypted value $E(R'_0)$.

In block S213, the second communication module 24 sends the encrypted value $E(R'_0)$ to the host 10.

In block S215, the first encryption/decryption module 13 obtains the first decrypted value $R'_0$ by decrypting the encrypted value $E(R'_0)$ using the symmetric decryption algorithm and the client initial key $K'_0$. The first validation module 15 checks if the first decrypted value $R'_0$ is the same as the first random number $R_0$, to determine if the client 20 passes the initial validation. If the first decrypted value $R'_0$ is different from the first random number $R_0$, the first validation module 15 determines that the client 20 fails in the initial validation, block S210 is implemented. Otherwise, if the first decrypted value $R'_0$ is the same as the first random number $R_0$, block S217 is implemented.

In block S217, the first validation module 15 determines that the client 20 passes the initial validation, and stores the second random number $K_0$ as the host initial key, then the procedure goes to block S103.

According to the above embodiments, every time the key used to encrypt data transmitted to the client 20 is computed based on a prior key used to encrypt prior transmitted data, the dynamic key is difficult to hack. Furthermore, the client 20 will be verified based on the prior key whenever requiring more data from the host 10, such a restricted validation mechanism efficiently protects security of the data.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-based data security protection method being performed by execution of computer readable program code by a processor of a host that transmits data to a client, the method comprising:
   (a1) determining a host key $K_n$ using a one-way hash function based on a host initial key $K_0$ stored in the host, wherein n is an integer having an initial value 1;
   (a2) generating encrypted data $X_n$ using a symmetrical encryption algorithm based on original data $R_n$ and the host key $K_n$;
   (a3) sending the encrypted data $X_n$ to the client, wherein the client stores a client initial key $K'_0$ and determines a client key $K'_n$ using the one-way hash function based on the client initial key $K'_0$;
   (a4) receiving validation data $X'_n$ sent from the client, and decrypting the validation data $X'_n$ using a symmetrical decryption algorithm and the host key $K_n$ to obtain decrypted data $R'_n$;
   (a5) checking if the decrypted data $R'_n$ is the same as the original data Rn, and determining that the client fails in the validation, refusing to transmit any more data, and ending the procedure if the decrypted data $R'_n$ is different from the original data $R_n$, or going to block (a6) if the decrypted data $R'_n$ is the same as the original data $R_n$; and
   (a6) setting that the client key $K'_{n-1}$ equals the host key $K_{n-1}$, and returning to block (a2) if there is original data $R_{n+1}$ to be transmitted, or ending the procedure if there is no more data to be transmitted.

2. A computer-based data security protection method being performed by execution of computer readable program code by a processor of a client that receives data from a host, the method comprising:
   (b1) receiving encrypted data $X_n$ sent from the host, wherein n is an integer having an initial value 1;
   (b2) determining a client key $K'_n$ using a one-way hash function based on a client initial key $K'_0$ stored in the client;
   (b3) determining decrypted data $R'_n$ by decrypting the encrypted data $X_n$ using a symmetrical decryption algorithm based on the client key $K'_n$;

(b4) generating validation data $X'_n$ using the symmetrical encryption algorithm based on the decrypted data $R'_n$ and the client key $K'_n$; and (b5) sending the validation data $X'_n$ to the host, to request the host to validate the client based on the validation data $X'_n$ for transmission of more data.

3. The data security protection method of claim 1, before block (a1) further comprising: (a0) performing initial validation of the host and the client, to generate the host initial key $K_0$ and the client initial key $K'_0$.

4. The data security protection method of claim 3, wherein block (a0) comprises:

(a01) generating a first random number $R_0$ and a second random number $K_0$, determining a one-way function value $H(R_0)$ of the first random number $R_0$, and generating test data $X_0$ by encrypting $R_0$, $K_0$ and $H(R_0)$ using a public key PK of an asymmetric encryption algorithm by the client;

(a02) sending the test data $X_0$ to the client;

(a03) decrypting the test data $X_0$ using a secret key SK of the asymmetric encrypted algorithm, to obtain a first decrypted value $R'_0$, a second decrypted value $K'_0$, and a decrypted function value $H(R'_0)$ of the first decrypted value $R'_0$;

(a04) determining a one-way function value $H'(R'_0)$ of the first decrypted value $R'_0$ using the one-way hash function;

(a05) checking if the one-way function value $H'(R'_0)$ is the same as the decrypted function value $H(R'_0)$, to determine if the public key PK matches the private key SK;

(a06) determining that the host fails in the initial validation and ending the procedure if the one-way function value $H'(R'_0)$ is different from the decrypted function value $H(R'_0)$, or going to block (a07) if the one-way function value $H'(R'_0)$ is the same as the decrypted function value $H(R'_0)$;

(a07) determining that the public key PK matches the private key SK, and storing the second decrypted value $K'_0$ in the client as the client initial key;

(a08) encrypting the first decrypted value $R'_0$ using the symmetric encryption algorithm and the client initial key $K'_0$, to obtain an encrypted value $E(R'_0)$, and sending the encrypted value $E(R'_0)$ to the host;

(a09) obtaining the first decrypted value $R'_0$ by decrypting the encrypted value $E(R'0)$ using the symmetric decryption algorithm and the client initial key $K'0$;

(a10) checking if the first decryption value $R'_0$ is the same as the first random number $R0$, to determine if the client passes the initial validation;

(a11) determining the client fails in the initial validation and ending the procedure if the first decrypted value $R'_0$ is different from the first random number $R0$, or going to block (a12) if the first decrypted value $R'_0$ is the same as the first random number $R_0$; and (a12) determining that the client passes the initial validation, storing the second random number $K_0$ in the host as the host initial key, and going to block (a1).

5. The data security protection method of claim 1, wherein the one-way hash function is selected from the group consisting of a message digest algorithm (MD5), a secure hash algorithm (SHA), a message authentication code (MAC), and a cyclic redundancy check (CRC).

6. The data security protection method of claim 1, wherein the symmetrical encryption algorithm is an advanced encryption standard (AES), or a data encryption standard (DES).

7. A non-transitory computer readable medium storing a set of instructions, the set of instructions capable of being executed by a processor of a host that transmits data to a client to perform a data security protection method, the method comprising:

(a1) determining a host key $K_n$ using a one-way hash function based on a host initial key $K_0$ stored in the host, wherein n is an integer having an initial value 1;

(a2) generating encrypted data $X_n$ using a symmetrical encryption algorithm based on original data $R_n$ and the host key $K_n$;

(a3) sending the encryption data $X_n$ to the client, wherein the client stores a client initial key $K'_0$ and determines a client key $K'_n$ using the one-way hash function based on the client initial key $K'_0$;

(a4) receiving validation data $X'_n$ sent from the client, and decrypting the validation data $X'_n$ using a symmetrical decryption algorithm and the host key $K_n$ to obtain decrypted data $R'_n$;

(a5) checking if the decrypted data $R'_n$ is the same as the original data $R_n$, determining that the client fails in the validation, refusing to transmit any more data, and ending the procedure in response to a determination that the decrypted data $R'_n$ is different from the original data $R_n$, or going to block (a6) if the decryption data $R'_n$ is the same as the original data $R_n$; and (a6) setting the client key $K'_{n-1}$ equals the host key $K_{n-1}$, and returning to block (a2) if there is original data $R_{n+1}$ to be transmitted, or ending the procedure if there is no more data to be transmitted.

8. A non-transitory computer readable medium storing a set of instructions, the set of instructions capable of being executed by a processor of a client that receives data from a host to perform a data security protection method, the method comprising:

(b1) receiving encrypted data $X_n$ sent from the host, wherein n is an integer having an initial value 1;

(b2) determining a client key $K'_n$ using a one-way hash function based on a client initial key $K'_0$ stored in the client;

(b3) determining decrypted data $R'_n$ by decrypting the encrypted data $X_n$ using a symmetrical decryption algorithm based on the client key $K'_n$;

(b4) generating validation data $X'_n$ using the symmetrical encryption algorithm based on the decrypted data $R'_n$ and the client key $K'_n$; and (b5) sending the validation data $X'_n$ to the host, to request the host to validate the client based on the validation data $X'_n$ for transmission of more data.

9. The non-transitory computer readable medium of claim 7, wherein before block (a1) further comprises: (a0) performing initial validation of the host and the client, to generate the host initial key $K_0$ and the client initial key $K'_0$.

10. The non-transitory computer readable medium of claim 9, wherein block (a0) comprises:

(a01) generating a first random number $R_0$ and a second random number $K_0$, determining a one-way function value $H(R_0)$ of the first random number $R_0$, and generating test data $X_0$ by encrypting $R_0$, $K_0$ and $H(R_0)$ using a public key PK of an asymmetric encryption algorithm by the client;

(a02) sending the test data $X_0$ to the client;

(a03) decrypting the test data $X_0$ using a secret key SK of the asymmetric encryption algorithm, to obtain a first decrypted value $R'_0$, a second decrypted value $K'_0$, and a decrypted function value $H(R'_0)$ of the first decrypted value $R'_0$;

(a04) determining a one-way function value $H'(R'_0)$ of the first decrypted value $R'_0$ using the one-way hash function;

(a05) checking if the one-way function value $H'(R'_0)$ is the same as the decrypted function value $H(R'_0)$, to determine if the public key PK matches the private key SK;

(a06) determining that the host fails in the initial validation and ending the procedure if the one-way function value $H'(R'_0)$ is different from the decrypted function value $H(R'_0)$, or going to block (a07) if the one-way function value $H'(R'_0)$ is the same as the decrypted function value $H(R'_0)$;

(a07) determining that the public key PK matches the private key SK, and storing the second decrypted value $K'_0$ in the client as the client initial key;

(a08) encrypting the first decrypted value $R'_0$ using the symmetric encryption algorithm and the client initial key $K'_0$, to obtain an encrypted value $E(R'_0)$, and sending the encrypted value $E(R'_0)$ to the host;

(a09) obtaining the first decrypted value $R'_0$ by decrypting the encrypted value $E(R'_0)$ using the symmetric decryption algorithm and the client initial key $K'_0$;

(a10) checking if the first decrypted value $R'_0$ is the same as the first random number $R_0$, to determine if the client passes the initial validation;

(a11) determining the client fails in the initial validation and ending the procedure if the first decrypted value $R'_0$ is different from the first random number R0, or going to block (a12) if the first decrypted value $R'_0$ is the same as the first random number $R_0$; and (a12) determining that the client passes the initial validation, storing the second random number $K_0$ in the host as the host initial key, and going to block (a1).

11. The non-transitory computer readable medium of claim 7, wherein the one-way hash function is selected from the group consisting of a message digest algorithm (MD5), a secure hash algorithm (SHA), a message authentication code (MAC), and a cyclic redundancy check (CRC).

12. The non-transitory computer readable medium of claim 7, wherein the symmetrical encryption algorithm is an advanced encryption standard (AES), or a data encryption standard (DES).

* * * * *